Oct. 13, 1936.   A. E. BALTHAZOR   2,057,322
FRONT BOX FENDER
Filed July 12, 1935

Inventor
ARTHUR E. BALTHAZOR.

By   Miller & Miller
Attorney

Patented Oct. 13, 1936

2,057,322

UNITED STATES PATENT OFFICE 2,057,322

FRONT BOX FENDER

Arthur E. Balthazor, Kankakee, Ill.

Application July 12, 1935, Serial No. 31,121

4 Claims. (Cl. 280—152)

This invention relates to a front box fender and has for an object to provide a box fender especially intended for use on the front wheel of vehicles such as automobiles, being especially intended to cooperate with the conventional streamlined fenders now generally used on automobiles.

Box fenders have already been provided for the rear wheels of automobiles, the box fender extending across the side of the conventional fender and concealing at least the upper half of the wheel. These box fenders prevent the side splashing of dirt and mud and improve the appearance and it is the purpose of this invention to make it possible to apply similar box fenders to the front wheels so as to gain similar advantages for the front wheels.

The front wheels of an automobile however, are used in steering the automobile and when turned so that the automobile will go around a corner, one edge or the other of the front wheel normally projects beyond the plane defined by the outer edge of the fender, and for this reason it is impossible to use the same type of box fender construction as is used on the rear wheel.

With this invention, however, it becomes possible to provide a box fender which will normally remain in the plane defined by the edge of the conventional fender, yet will turn to permit the front wheels to turn whenever the car is being steered in any direction other than a straight-ahead direction. To provide this, the front box fender of this invention is so connected to the cone axle of the steerable front wheel that the box fender partakes of the same rotary motion as does the front wheel, thereby causing the box fender of this invention to always remain parallel to the front wheel and not interfere with the use thereof for steering purposes.

The box fender of this invention is further so connected to the front wheel that while it partakes of the steering motion, it does not partake of the up and down motion permitted the front wheel by the fact that it is suspended from the vehicle frame by means of a conventional spring so that the front wheel may partake of its normal up and down motion permitted by springs without affecting the fender of this invention, yet will turn the fender as necessary to permit steering.

With the foregoing and other objects in view, as will hereinafter become apparent, this invention comprises the constructions, combinations and arrangements of parts hereinafter set forth, disclosed and shown on the accompanying drawing. In this drawing.

Figure 1:
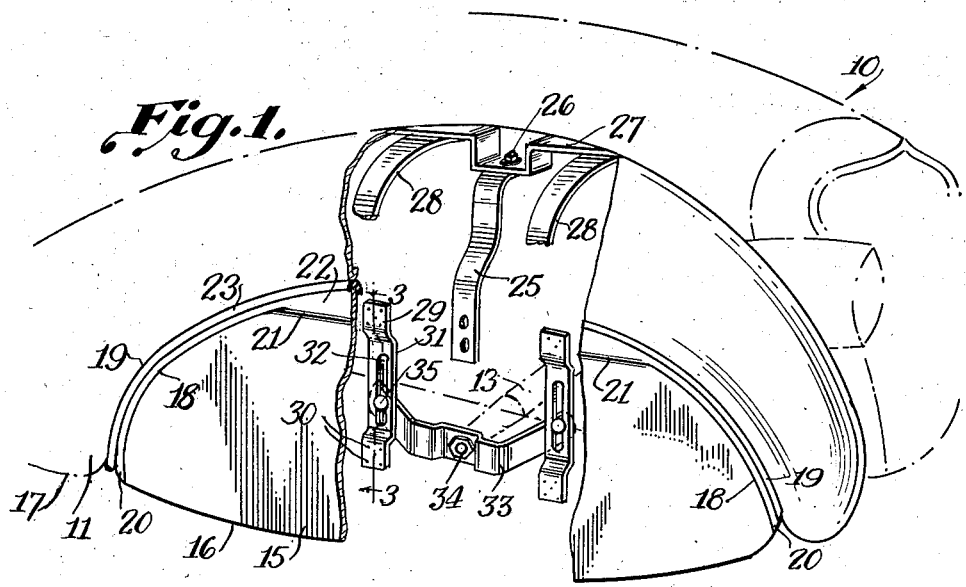
Fig. 1 is a partly sectional and partly elevational view of the box fender and mounting mechanism of this invention.

There is shown at 10 an automobile having the usual conventional streamlined front fender 11 beneath which is located the usual front wheel 12 located on and steered by the usual cone axle 13, all of which structure is conventional, the wheel 12 being turned to steer the car 10 in the usual manner by means of the usual steering wheel. The usual conventional spring of any form provides easy riding between the wheel and the automobile frame, thereby causing the usual conventional vertical variation in distance between the wheel 12 and the fender 11 and when the wheel 12 is turned to cause the car 10 to travel either to the right or the left, the front or rear edge of the wheel 12 normally projects beyond the plane defined by the edges 14 of the fender 11.

The box fender 15 of this invention consists of a section of metal of suitable gauge which may be finished to harmonize with the finish on the fender 11. This fender 15 has a lower edge 16 which is approximately a continuation of the lower edge 17 of the fender 11. The side edges 18 of the box fender 15 are spaced apart a distance slightly less than the corresponding distance between the edges 19 of the fender 11, and a metal reinforcing strip 20 is secured along the sides 18 of the fender 15. This strip 20 is substantially one inch in width along the sides but is widened to approximately the maximum of a four inch width along the top edge 21 of the fender 15, as shown at 22. The outside edges of the reinforcing metal strips 20 and 22 are still slightly less in distance across the fender 15 than is the distance between the edges 19 and 14 of the fender 11, thereby permitting the box fender 15 to be rotated through the space defined by the edges 19 and 14 of the fender 11 without contact therewith.

A soft rubber strip 23 is placed about the outer edge of the metal reinforcing strips 20 and 22 and serves to seal off this space between the meeting edges whenever the box fender 15 is in straight-ahead position, that is, when the car is traveling straight ahead. Although this strip 23 has been shown as being placed about the edge of the reinforcing on the box fender, it is obvious that, if desired, it may be placed about the edges 14 and 19 of the fender 11.

The box fender 15 and its reinforcing strips 20 and 22 are secured by means of bolts 24 to an arm 25 which is pivoted at 26 to a bracket 27, the bracket 27 being secured to the bottom of the fender 11 and being reinforced by means of two braces 28 extending at right angles thereto along the under side of the fender 11 as far as the edge 14. This arm 25 carries the weight of the fender 15 but permits it to rotate with the turning of the wheel 12, for the pivot 26 is located in a vertical line with the turning point of the wheel 12.

Figures 2, 3:
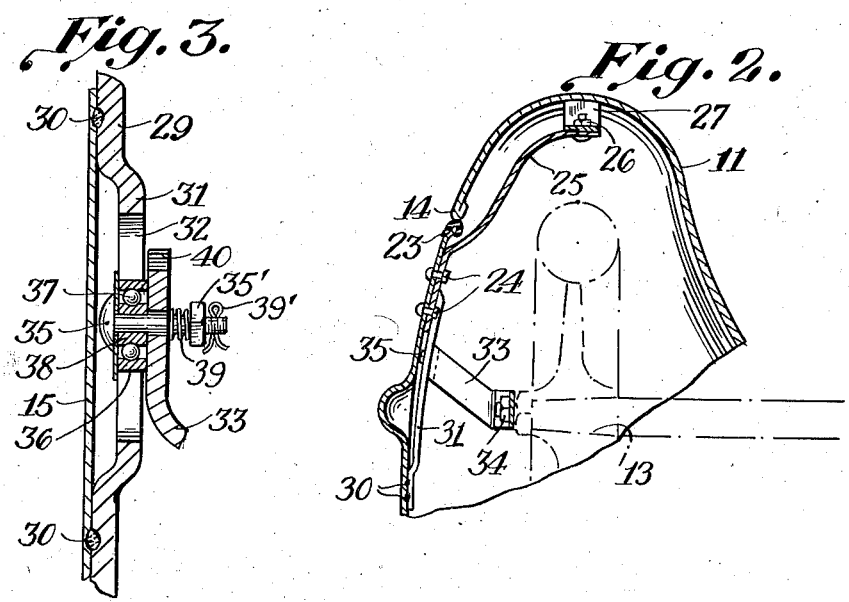
Fig. 2 is a sectional view in a plane intersecting the automobile fender at right angles to the longitudinal direction.
Fig. 3 is a section on line 3—3 of Fig. 1.

In order to cause the box fender 15 to turn as the wheel 12 is turned, a pair of frame members 29 are secured to the back of the fender 15 in any suitable manner, preferably by spot welding as shown at 30. The frames 29 are recessed as at 31 so as to be spaced from the fender 15, as shown in Fig. 3, and vertical slots 32 extend through this reset portion. A cross arm 33, centrally apertured to fit the ends of the wheel cone 13, is secured to the wheel cone 13 by means of the usual wheel securing nut 34. Secured to each end of the cross arm 33 by means of a bolt 35 and nut 35' is a bearing wheel 36 rotating on ball bearing 37 extending about a ball race 38 through which the bolts 35 extend, a spring 39 being interposed between the nut 35' and arm 33, while a cotter pin 39' holds the nut 35' against being lost.

In operation the wheel 36 is placed in the slot 32 of the frame 29, the diameter of the heads of bolts 35 being greater than the diameter of the slots 32 and serving to hold the wheels 36 in proper position in the slots 32 while the end 40 of the cross-arm 33 prevents the wheel 36 from being drawn rearwardly out of the slot.

In operation this construction permits the front wheel 12 to move vertically relative to the box fender 15 without affecting the same, but whenever the front wheel 12 is turned to steer the automobile, the cross arm 33, acting through the wheels 36 and the frames 29, cause the box fender 15 to rotate about the pivot 26 and to resume its straight-ahead position as soon as the wheel 12 resumes the straight-ahead position.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. A box fender for use in cooperation with the front fender of a vehicle, said box fender comprising a side wall adapted to substantially fill the space between the side edges of the vehicle fender, means secured to the vehicle fender pivotally securing said wall member in said space, and means secured to the steering axle of the vehicle front wheel for pivoting said box fender, said pivoting means including an arm adapted to be secured to the steering axle, and a pin and vertical slot connection between said arm and said wall member permitting relative vertical movement between said steering axle and said side wall but causing said side wall to pivot with said steering axle.

2. A box fender for use in cooperation with the front fender of a vehicle, said box fender comprising a side wall adapted to substantially fill the space between the side edges of the vehicle fender, means secured to the vehicle fender pivotally securing said wall member in said space, and means secured to the steering axle of the vehicle front wheel for pivoting said box fender, said pivoting means including an arm adapted to be secured to the steering axle, a pin and vertical slot connection between said arm and said wall member permitting relative vertical movement between said steering axle and said side wall but causing said side wall to pivot with said steering axle, said pin and slot connection including a vertical member attached to the wall member, a vertical slot in said vertical member, a ball bearing wheel vertically moveable in said slot, and an axle member extending through said ball bearing wheel and secured to the cross arm secured through said steering axle.

3. A front box fender for an automobile adapted to substantially fill the space between the side edges of the vehicle fender, said front box fender including a brace member, means for pivoting said brace member to said vehicle member in vertical alignment with the center of rotation of the steering axle of the vehicle, and box fender pivoting means causing said box fender to pivot with said steering axle, said box fender pivoting means comprising a pair of vertical straps secured to said box fender, a vertical slot at each of said vertical straps, a cross arm adapted to be secured to the steering axle of the vehicle, and pin and slot connections between each end of said cross arm and said vertical straps whereby relative vertical movement between said axle and said fender may take place and causing said box fender to partake of the pivoting movement of said axle.

4. A front box fender for an automobile adapted to substantially fill the space between the side edges of the vehicle fender, said front box fender including a brace member, means for pivoting said brace member to said vehicle member in vertical alignment with the center of rotation of the steering axle of the vehicle, box fender pivoting means causing said box fender to pivot with said steering axle, said box fender pivoting means comprising a pair of vertical straps secured to said box fender, a vertical slot at each of said vertical straps, a cross arm adapted to be secured to the steering axle of the vehicle, and pin and slot connections between each end of said cross arm and said vertical strap whereby relative vertical movement between said axle and said fender may take place and causing said box fender to partake of the pivoting movement of said axle, said pin and slot connection including a ball bearing wheel secured on the end of a cross arm and guided for vertical movement in said vertical slot.

ARTHUR E. BALTHAZOR.